(12) United States Patent
Wang et al.

(10) Patent No.: US 8,307,222 B2
(45) Date of Patent: Nov. 6, 2012

(54) FLEXIBLE CELL BATTERY SYSTEMS AND METHODS FOR POWERING INFORMATION HANDLING SYSTEMS

(75) Inventors: Ligong Wang, Round Rock, TX (US); Qing Wei Zhu, Shanghai (CN); Qing Shun Yang, Shanghai (CN); Wei Jian Zhu, Shanghai (CN)

(73) Assignee: Dell Products, LP, Round Rock, TX (US)

(*) Notice: Subject to any disclaimer, the term of this patent is extended or adjusted under 35 U.S.C. 154(b) by 490 days.

(21) Appl. No.: 12/586,676

(22) Filed: Sep. 25, 2009

(65) Prior Publication Data
US 2011/0078470 A1 Mar. 31, 2011

(51) Int. Cl.
*G06F 1/26* (2006.01)
(52) U.S. Cl. .................. 713/300; 713/310; 713/320
(58) Field of Classification Search .................. 713/300, 713/310, 320
See application file for complete search history.

(56) References Cited

U.S. PATENT DOCUMENTS

| | | | |
|---|---|---|---|
| 3,496,450 A * | 2/1970 | Thiele | 323/269 |
| 5,571,634 A | 11/1996 | Gozdz et al. | |
| 5,650,240 A * | 7/1997 | Rogers | 429/61 |
| 5,703,463 A | 12/1997 | Smith | 320/134 |
| 5,717,937 A * | 2/1998 | Fritz | 713/300 |
| 5,818,200 A | 10/1998 | Cummings et al. | |
| 5,825,155 A * | 10/1998 | Ito et al. | 320/118 |
| 5,898,291 A * | 4/1999 | Hall | 320/121 |
| 5,982,145 A * | 11/1999 | Eguchi | 320/128 |
| 6,005,367 A | 12/1999 | Rohde | |
| 6,063,519 A | 5/2000 | Barker et al. | |
| 6,087,035 A * | 7/2000 | Rogers et al. | 429/61 |
| 6,731,022 B2 | 5/2004 | Silverman | |
| 6,892,147 B2 | 5/2005 | Bui et al. | |
| 6,948,078 B2 * | 9/2005 | Odaohhara | 713/300 |
| 7,378,819 B2 | 5/2008 | Wang et al. | |
| 7,391,184 B2 | 6/2008 | Luo et al. | |
| 7,840,840 B2 * | 11/2010 | Takahashi et al. | 714/14 |
| 8,022,671 B2 * | 9/2011 | Chueh et al. | 320/127 |
| 2005/0017685 A1 * | 1/2005 | Rees et al. | 320/132 |
| 2007/0279953 A1 | 12/2007 | Hoff et al. | |
| 2008/0042618 A1 * | 2/2008 | Cromer et al. | 320/134 |
| 2009/0193277 A1 * | 7/2009 | Chueh et al. | 713/340 |

OTHER PUBLICATIONS

Wang et al, "Activating an Information Handling System Battery From a Ship Mode", U.S. Appl. No. 12/253,829, filed Oct. 17, 2008, 27 pgs.

* cited by examiner

*Primary Examiner* — Kim Huynh
*Assistant Examiner* — Zahid Choudhury
(74) *Attorney, Agent, or Firm* — O'Keefe, Egan, Peterman & Enders LLP (57) ABSTRACT

The number of battery cells connected together in a main battery conductor path of a multiple cell battery system of an information handling system may be varied in real time based on one or more operating conditions (e.g., system load power consumption, battery cell failure, etc.) of the information handling system. Defective battery cells may be bypassed such that the defective battery system may continue to operate and power an information handling system at a lower voltage, e.g., either temporarily, permanently or temporarily until the user procures a suitable replacement battery system. Interconnection of cells of a non-defective multiple cell battery system may also be selectively re-arranged to vary battery system voltage at particular times or during particular information handling system operation modes.

34 Claims, 6 Drawing Sheets

FLEXIBLE CELL BATTERY SYSTEMS AND METHODS FOR POWERING INFORMATION HANDLING SYSTEMS

FIELD OF THE INVENTION

This invention relates generally to batteries, and more particularly to batteries for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by rechargeable battery pack systems such as lithium ion ("Li-ion") or nickel metal hydride ("NiMH") battery packs. The rechargeable battery packs generally include multiple battery cells connected in serial and/or parallel configuration. When a one cell of a battery pack fails or otherwise becomes defective, the battery pack enters a permanent failure mode in which the battery pack is disabled and produces no power for powering the portable information handling system. In such a case, the battery pack must be replaced, which may cause the user to order and wait for a new battery pack to be delivered.

SUMMARY OF THE INVENTION

Disclosed herein are information handling system battery systems and methods of use therefor. Using the disclosed systems and methods, the number of battery cells connected together in a main battery conductor path of a multiple cell battery system may be varied in real time based on one or more operating conditions (e.g., system load power consumption, battery cell failure, etc.) of the information handling system. In this regard, interconnection of the cells of a multiple cell battery system (e.g., replaceable battery pack) may be changed and/or re-arranged, e.g., in the event of a cell failure, and/or to reduce overall battery pack voltage to meet reduced power situations such as sleep or idle mode of a portable information handling system (e.g. laptop computer, notebook computer, netbook computer, personal data assistant, MP3 layer, cell phone, etc.) to which the battery pack is electrically coupled. Further, when the battery cells are rechargeable, the number of battery cells connected together in the main battery conductor path of a multiple cell battery system may be varied so that the battery cell configuration is different for charging operations than for discharging operations.

In one exemplary embodiment, when a given battery cell/s of a multiple cell battery pack fails, the defective cell/s may be bypassed such that the defective battery pack may continue to operate and power an information handling system at a lower voltage, e.g., either permanently or until the user procures a suitable replacement battery pack. This is in contrast to conventional battery cells which go into permanent failure (shut down) mode immediately upon failure of one or more battery cell/s of the battery pack, thus inconveniencing the user and disabling the information handling system for potentially a lengthy period of time until a suitable replacement battery can be obtained or a source of AC power is made available.

In another exemplary embodiment, the interconnection of cells of a non-defective multiple cell battery pack may be selectively re-arranged to vary battery pack voltage at particular times or during particular information handling system operation modes, e.g., so as to reduce battery pack voltage when the information handling system is operating in a low power mode such as sleep or idle mode and/or so as to increase battery pack voltage when the information handling system is operating in a higher power mode such as fully awake mode or when processor or other system power load is increased. The non-defective battery pack may be then returned to an increased voltage, e.g., returned to full voltage operating mode when the information handling system returns to normal (fully awake) operating mode. Thus, the disclosed systems and methods may be implemented in one example to reduce battery pack voltage for a sleeping information handling system in a manner that increases power conversion frequency, as compared to experiencing the reduction in power conversion efficiency experienced by conventional information handling system battery packs when powering a sleeping information handling system.

In another exemplary embodiment, battery cell circuitry of a multiple cell battery system may be controlled by a single microcontroller or other suitable processing device, and/or with no communication among modules. Further, a microcontroller may operate to detect imbalance between modules of a multiple module battery system and to restore balance between the modules of the battery cell circuitry of the battery system by removing the defective or degraded cell/s from the main battery conductor path of the affected module, e.g., when imbalances occur between modules due to occurrence of defective or degraded battery cells. In this regard, when a defective or degraded cell/s is reported in one module of the battery system, all other modules may be re-configured to match (e.g., so as to balance the modules of the battery cell circuitry) in view of the defective or degraded cell/s of the affected module. If and when the microcontroller determines that balance can later be restored between the multiple modules with all battery cells inserted in the main battery conductor path of each module (e.g., due to discharge and charge cycling of the battery cells), the microcontroller may reinsert the removed cells back into the main battery conductor path of each module.

In one respect, disclosed herein is an information handling system, including: a system load; a battery system having a main battery conductor path coupled to power the system load, the battery system including battery cell circuitry including multiple battery cells coupled together in the main battery conductor path in at least one of series relationship, parallel relationship, or a combination thereof, and one or more switching devices coupled to selectively bypass or remove one or more of the multiple battery cells from the main battery conductor path of the battery cell circuitry; and at least one processing device coupled to control the one or more switching devices to selectively remove one or more of the multiple battery cells from the main battery conductor path of the battery cell circuitry.

In another respect, disclosed herein is a method of controlling a battery system of an information handling system, including: providing a battery system having a main battery conductor path coupled to power a system load of the information handling system, the battery system including battery cell circuitry including multiple battery cells coupled together in the main battery conductor path in at least one of series relationship, parallel relationship, or a combination thereof, one or more switching devices coupled to selectively bypass or remove one or more of the multiple battery cells from the main battery conductor path of the battery cell circuitry; and controlling the one or more switching devices to selectively remove one or more of the multiple battery cells from the main battery conductor path of the battery cell circuitry.

In another respect, disclosed herein is a replaceable smart battery pack configured for powering an information handling system, including: a main battery conductor path configured for coupling to power the system load; battery cell circuitry including multiple battery cells coupled together in the main battery conductor path in at least one of series relationship, parallel relationship, or a combination thereof; one or more switching devices coupled to selectively bypass or remove one or more of the multiple battery cells' from the main battery conductor path of the battery cell circuitry; and at least one processing device coupled to control the one or more switching devices to selectively remove one or more of the multiple battery cells from the main battery conductor path of the battery cell circuitry.

DESCRIPTION OF ILLUSTRATIVE EMBODIMENTS

Figure 1:
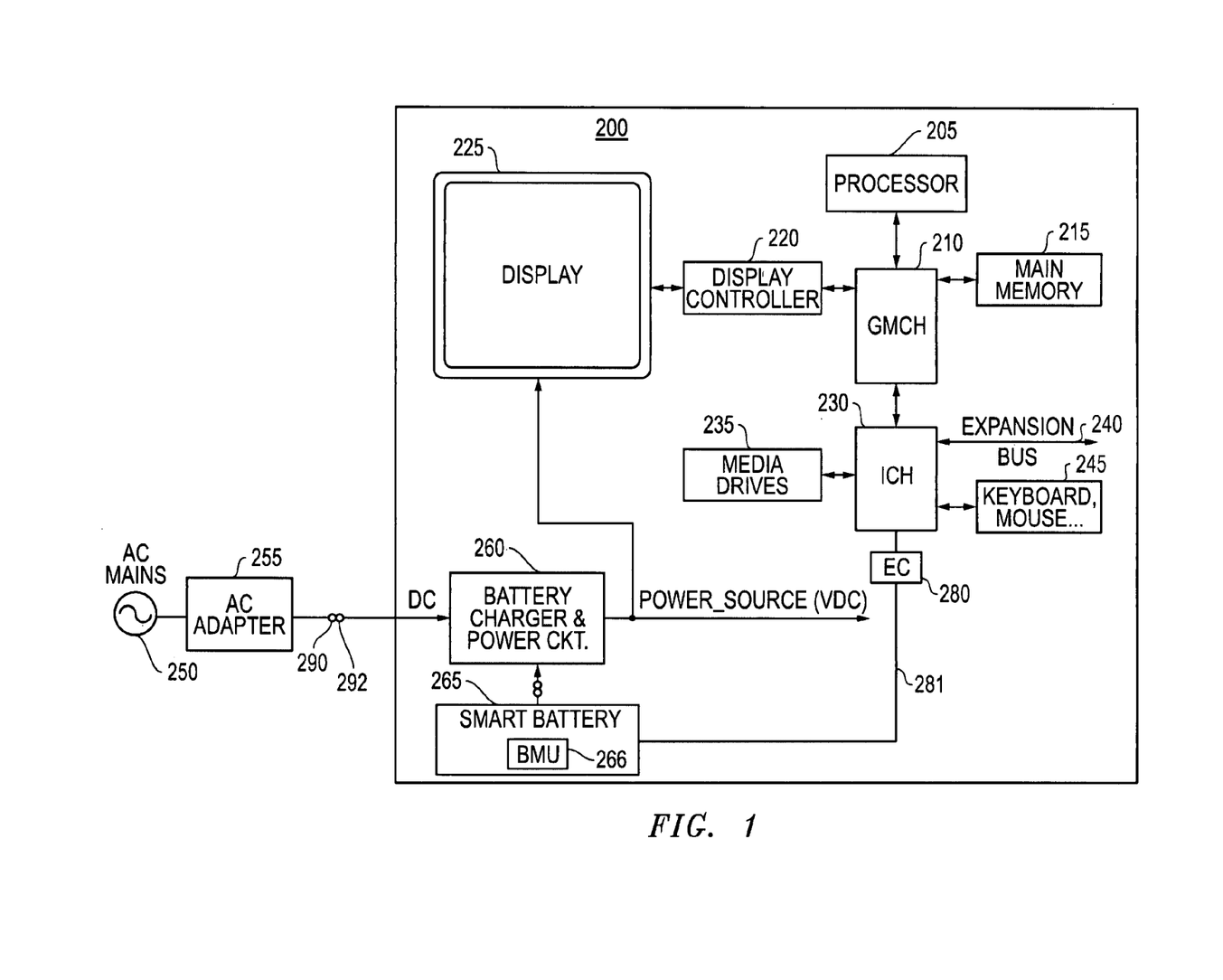
FIG. 1 is a block diagram of an information handling system according to one exemplary embodiment of the disclosed systems and methods.
Figure 2:
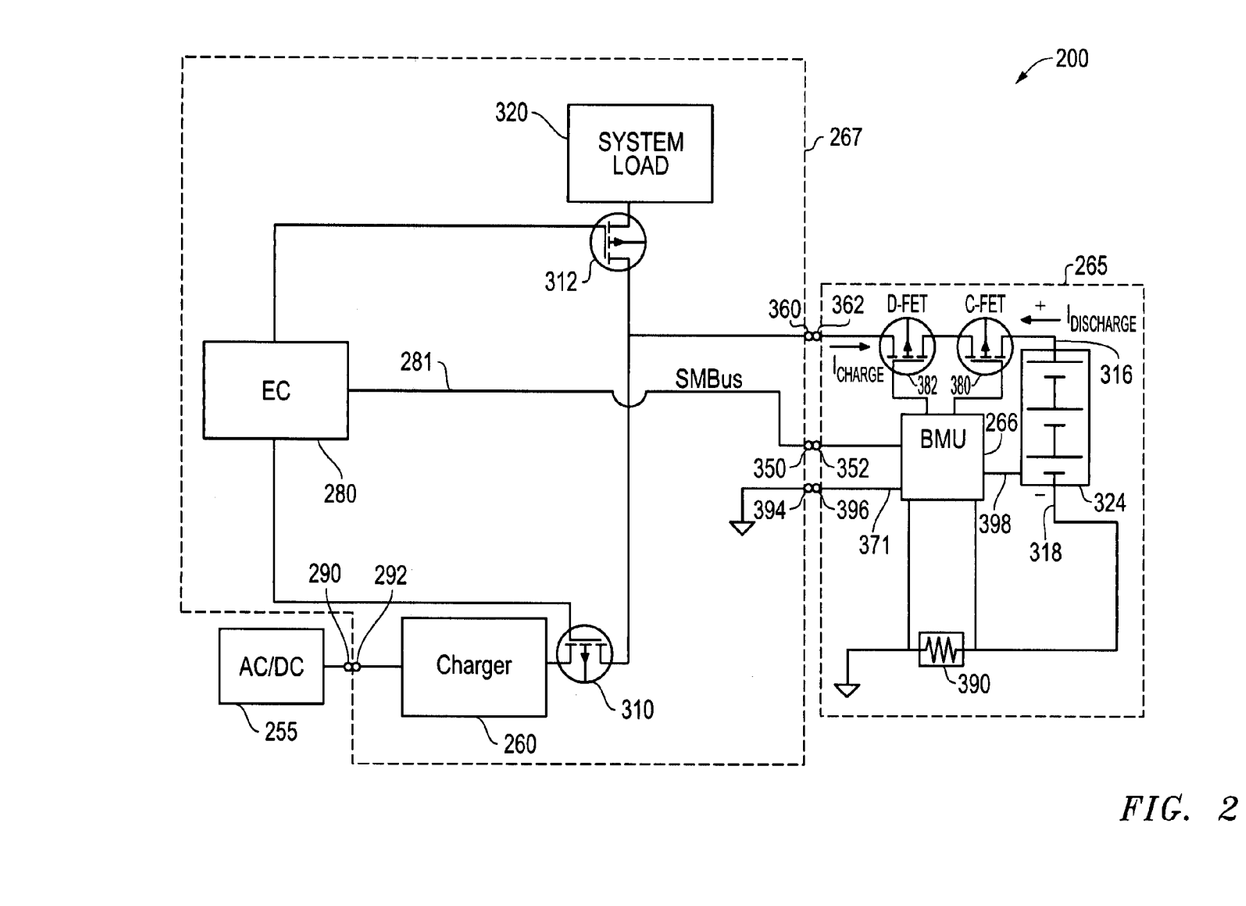
FIG. 2 is a block diagram of an information handling system according to one exemplary embodiment of the disclosed systems and methods.

FIG. 1 is a block diagram of an information handling system 200 (e.g., portable information handling system such as notebook computer, MP3 player, personal data assistant (PDA), cell phone, cordless phone, etc.) as it may be configured according to one exemplary embodiment of the disclosed systems and methods. As shown in FIG. 2, information handling system 200 of this exemplary embodiment includes a processor 205 such as an Intel Pentium series processor, an Advanced Micro Devices (AMD) processor or one of many other processors currently available. A graphics/memory controller hub (GMCH) chip 210 is coupled to processor 205 to facilitate memory and display functions. System memory 215 and a display controller 220 are coupled to GMCH 210. A display device 225 (e.g., video monitor) may be coupled to display controller 220 to provide visual images (e.g., via graphical user interface) to the user. An I/O controller hub (ICH) chip 230 is coupled to GMCH chip 210 to facilitate input/output functions for the information handling system. Media drives 235 are coupled to ICH chip 230 to provide permanent storage to the information handling system. An expansion bus 240 is coupled to ICH chip 230 to provide the information handling system with additional plug-in functionality. Expansion bus 240 may be a PCI bus, PCI Express bus, SATA bus, USB or virtually any other expansion bus. Input devices 245 such as a keyboard and mouse are coupled to ICH chip 230 to enable the user to interact with the information handling system. An embedded controller (EC) 280 running system BIOS is also coupled to ICH chip 230.

In this particular embodiment, information handling system 200 is coupled to an external source of AC power, namely AC mains 250 and AC adapter 255. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes an analog front end ("AFE") and microcontroller. Further, a battery system data bus (SMBus) 281 is coupled to smart battery pack 265 to provide battery state information, such as battery voltage and current information, from BMU 266 of smart battery pack 265 to EC 280. Battery charger/power circuit 260 of information handling system 200 may also provide DC power for recharging battery cells of the battery system 265 during charging operations.

When a battery system is provided as a replaceable battery pack, it may be configured for insertion and removal from a corresponding battery pack compartment defined within the chassis of an information handling system (e.g., such as a notebook computer), and may be provided with external power and data connector terminals for contacting and making interconnection with mating power connector terminals and data connector terminals provided within the battery pack compartment to provide power to the system load of the information handling system and to exchange data with one or more processing devices of the information handling system. For example, as shown for the exemplary embodiment of FIG. 2, replaceable smart battery pack 265 may be removably coupled to, and is separable from, other system components 267 of information handling system 200 at a terminal node by engagement of system side electrical power terminals 360, 394 with battery pack side electrical power terminals 362, 396 (operational electrical contact). In this regard, smart battery pack 265 may include battery cell circuitry 324 coupled to electrical power terminals 362 that are configured to be removably coupled to system side electrical power terminals 360 so that terminals 360 contact terminals 362 to allow current to be interchanged between smart battery pack 265 and other system components 267 of information handling system 200. Battery cell circuitry 324 may be any type of rechargeable battery cell's or combination thereof that is suitable for recharging. Examples of such battery cells include, but are not limited to, Li-ion battery cells, NiMH battery cells, nickel cadmium (NiCd) battery cells, lithium-polymer (Li-polymer) battery cells, etc.

Battery pack 265 also includes SMBus terminals 352 that are configured to be removably coupled to system side SMBus terminals 350 to allow data to be interchanged between smart battery pack 265 and EC 280. A logic control circuitry 398 is also present to control and convey battery cell status information to BMU 266 from battery cell circuitry 324, and to convey control signals BMU 266 to switching circuitry that is coupled between battery cell circuitry 324 in a manner that will be described further herein. It will be understood that functions of EC 280 may alternatively be performed by a keyboard controller in other embodiments. Also shown in FIG. 2 are switching elements 310 and 312 which are each controlled by EC 280, and which may be present to regulate current flow from charger 260 and to regulate current flow to system load 320, respectively. In this regard, system load 320 may comprise system components such as display 225, processor 205, media drives 235, etc. of FIG. 1, and/or may include additional, fewer or alternative system components that draw current. It will be understood that any other number and/or type of switching elements suitable for controlling current flow between charger 260, system load 320 and/or battery pack 265 may be present. Examples of types of suitable switching elements include, but are not limited to, bipolar junction transistors (BJTs) and field effect transistors (FETs).

Smart battery pack 265 is also shown provided with battery current control circuitry to control flow of charge current to battery cell circuitry 324 of battery pack 265, and to also control flow of discharge current from battery cell circuitry 324 of battery pack 265. In this exemplary embodiment, the charge and discharge circuitry includes two field effect transistors ("FETs") 380 and 382 coupled in series between battery charge terminal 362 and battery cell circuitry 324. FET 380 is a charge FET switching element that forms a part of a charge circuit that is controlled by components (e.g., microcontroller and/or AFE) of BMU 266 to allow or disallow charge current to the battery cell circuitry 324, and FET 382 is a discharge FET switching element that forms a part of discharge circuit that is controlled by components (e.g., microcontroller and/or AFE) of BMU 266 to allow or disallow discharge current from the battery cell circuitry 324. Body diodes may be present across the source and drain of each FET switching element, i.e., to conduct charge current to the battery cell/s when the discharge FET switching element 382 is open, and to conduct discharge current from the battery cell/s when the charge FET switching element 380 is open. It will be understood that battery current control circuitry of battery pack 265 may include any other number and/or type of charge and discharge switching elements suitable for performing the current control tasks described herein. Examples of types of suitable switching elements include, but are not limited to, bipolar junction transistors (BJTs) and field effect transistors (FETs).

During normal battery pack operations both charge and discharge FET switching elements 380 and 382 are placed in the closed state by BMU 266, which also monitors voltage of battery cell circuitry 324. If BMU 266 detects a battery over-voltage condition, BMU 266 opens the charge FET switching element 380 to prevent further charging of the battery cell/s until the over-voltage condition is no longer present. Similarly, if BMU 266 detects a battery under-voltage (or over-discharge) condition, BMU 266 opens the discharge FET switching element 382 to prevent further discharging of the battery cell/s until the under-voltage condition is no longer present. BMU 266 may also open the charge FET switching element 214 when the battery pack is in sleep mode. A current sense resistor 390 is present in the battery pack circuitry to allow BMU 266 to monitor charge current to the battery cell/s. Further information on BMU, battery pack and battery charging operations may be found in U.S. Pat. Nos. 7,378,819, 7,391,184, and U.S. patent application Ser. No. 12/253,829 filed Oct. 17, 2008, each of which is incorporated herein by reference in its entirety.

It will be understood that the functions of BMU 266 described herein may be implemented using any circuitry and/or control logic configuration suitable for performing the tasks thereof. For example, in one embodiment, one or more features of BMU 266 may be implemented using a controller (e.g., processor and associated firmware) that is integral to battery pack 265 or using any other suitable configuration of microcontroller/microprocessor, firmware and/or software that interfaces with battery pack circuitry/components. Furthermore, it will be understood that the herein-described tasks of BMU 266 may be performed by a single integrated component or by two or more separate components. In addition, it will be understood that removal and reinstallation of a battery pack 265 in operational electrical contact with other components 267 of the information handling system may be monitored using any other alternative circuitry configuration to system-present pin 371 that is suitable for indication thereof.

Figure 3:
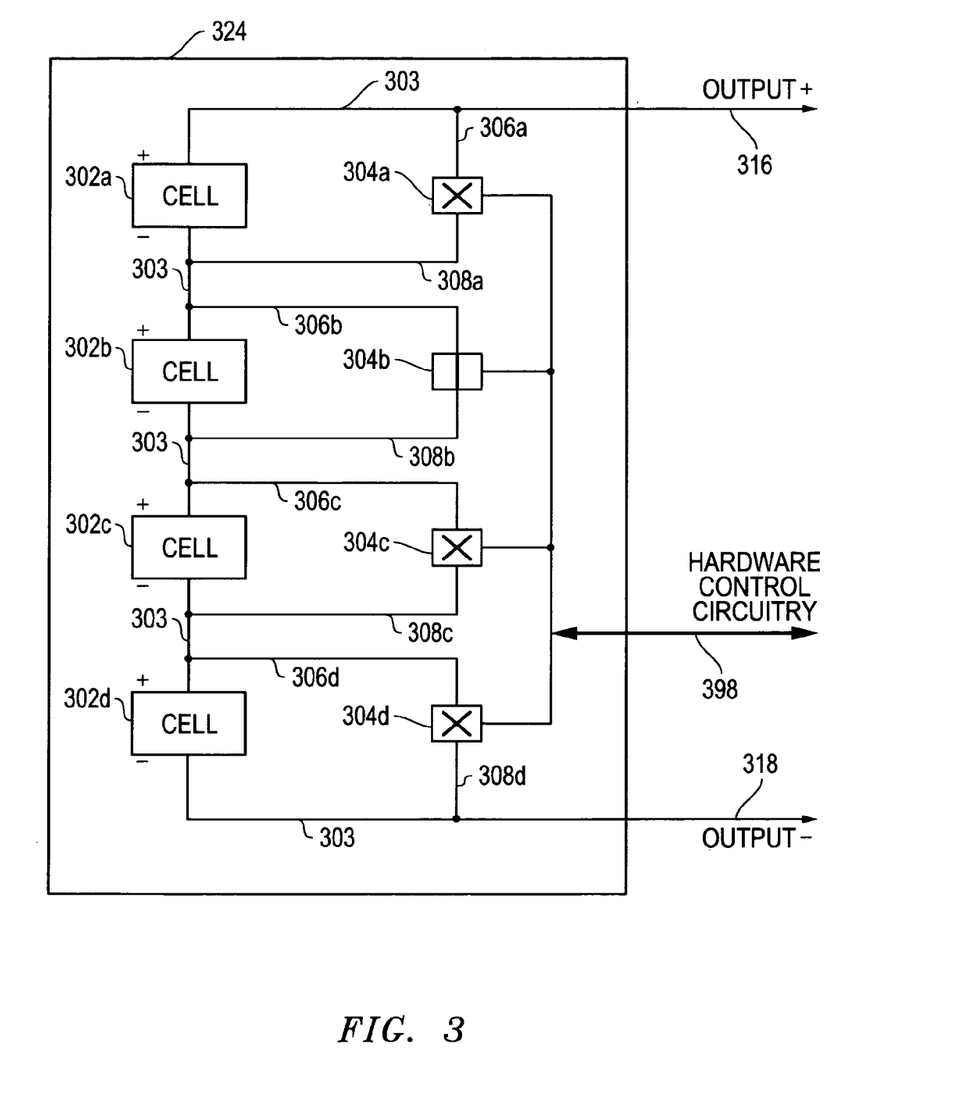
FIG. 3 is a block diagram of battery cell circuitry according to one exemplary embodiment of the disclosed systems and methods.

FIG. 3 illustrates battery cell circuitry 324 as it may be configured according to one exemplary embodiment of the disclosed systems and methods. In this embodiment, battery cell circuitry 324 is provided with four battery cells 302a-302d that are coupled together by main battery conductor path 303 in a 4S1P configuration (i.e., a matrix of 4 battery cells in series by one battery cell in parallel) between battery output terminals 316 and 318. As further shown, a corresponding switch device (e.g., field effect transistor ("FET") or other suitable controllable switching device) 304a-304d is provided for each respective one of battery cells 302a-302d. Each switch device 304 is coupled in parallel to form a conductive path around a corresponding battery cell 302 by respective bypass conductors 306 and 308 provided for each corresponding switch device 304 around a corresponding battery cell 302. Hardware control circuitry 398, e.g. analog to digital converter circuitry (ADC) and/or general purpose input/output (GPIO) port circuitry, is provided as shown to independently and selectively control operation of each switch device 304 based on control signals received from BMU 266 or other suitable processing device/s. Hardware Control circuitry 398 may also convey cell information, e.g. voltage, to BMU 266 or other suitable processing device/s from each cell 302 of battery cell circuitry 324. Examples of processing devices that may be employed for controlling and monitoring status of battery cell circuitry 324 include, for example, controller, microcontroller, processor (e.g., CPU), FPGA, ASIC, etc. Although such a processing device may be internal to and contained within the smart battery pack that includes the battery cell circuitry 324 (e.g., as is the case with BMU 266), it may alternatively be provided external to the given battery pack in which the monitored and controlled battery cell circuitry 324, e.g., within the information handling system 267.

Still referring to FIG. 3, during normal operation of battery cell circuitry 324, each of switching devices 304a-304d are set in an open (non-conducting) condition, such that such that current is provided from all battery cells 302a-302d to deliver full battery capacity operation in the 4S1P configuration. When a given cell/s 302 of battery cell circuitry 324 fails or otherwise becomes defective, this information is communicated to BMU 266 via status and control bus 398. BMU 266 then responds by providing control signal/s via status and control bus 398 to close the switching device/s 304 that correspond to the defective cell/s 302 so as to form a conductive path around each of the defective cell/s 302 so as to electrically bypass the defective cells within main battery conductor path 303 (e.g., for both charging and discharging purposes), leaving the non-defective cell/s electrically coupled within the main battery conductor path 303 and supplying power to the main battery conductor path 303.

For example, in the particular illustrated embodiment of FIG. 3, switching device 304b has been closed to bypass defective battery cell 302b by creating a conductive path through respective bypass conductors 306b and 308b and closed switching device 304b to create a 3S1P battery configuration. The remaining switching devices 304a, 304c and 304d remain in an open condition so that cells 302a, 302c and 302d remain electrically coupled within the main battery conductor path 303. This action downgrades the capability of the battery pack 265, but allows the battery pack 265 to continue operating at a reduced voltage to supply power to other system components 267 of information handling system 200, e.g., until a replacement battery pack 265 may be obtained. Although one example of battery cell circuitry 324 having 4S1P configuration is illustrated in FIG. 3, it will be understood that the disclosed systems and methods may be implemented with battery cell circuitry having any number and configuration of multiple battery cells, e.g., having two or more battery cells 302 coupled in series and/or two or more battery cells coupled in parallel. Furthermore, it will be understood that any other switching device configuration may be employed that is effective to selectively isolate individual battery cells or groups of battery cells within battery cell circuitry.

Figure 4:
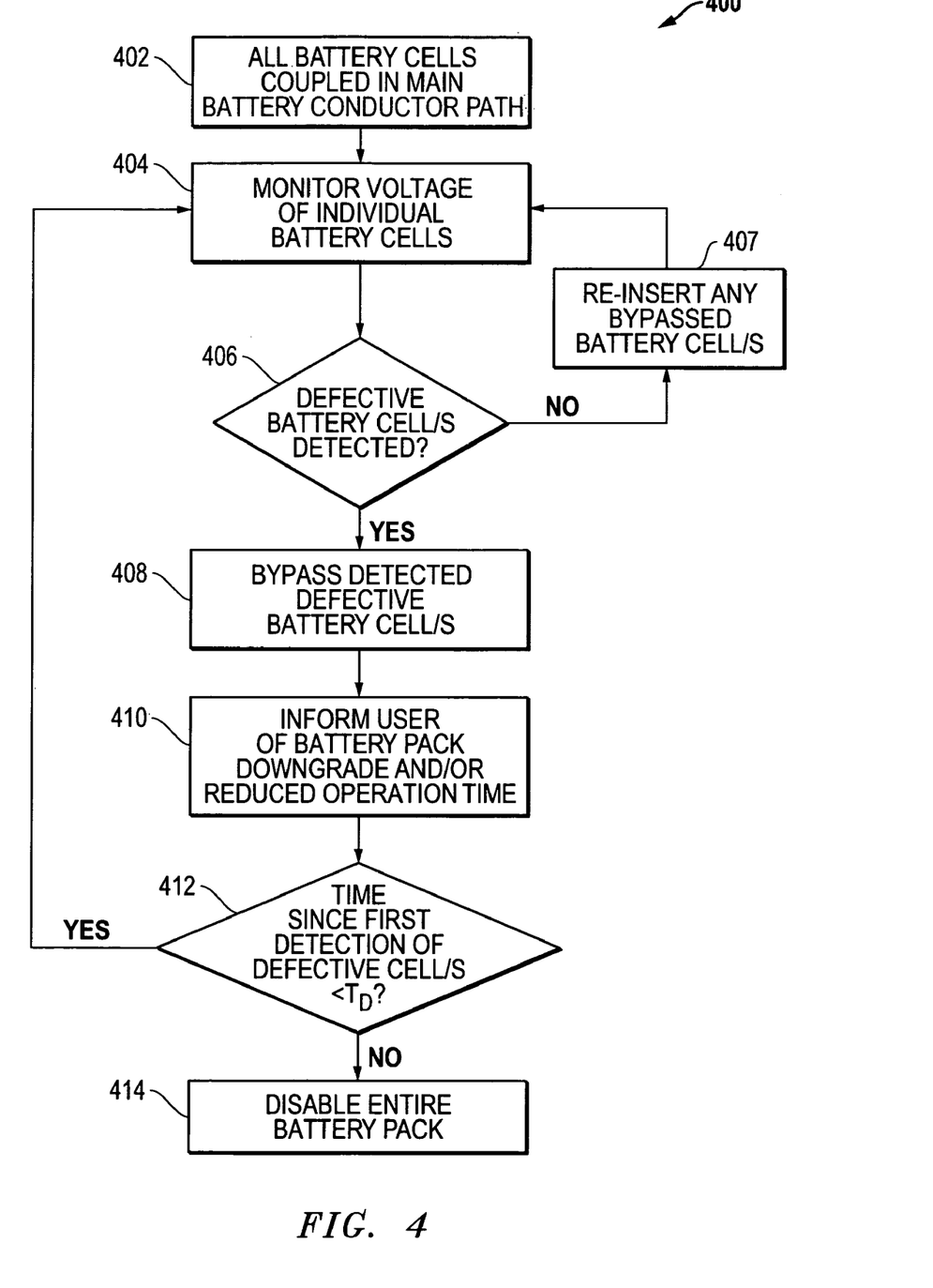
FIG. 4 illustrates methodology according to one exemplary embodiment of the disclosed systems and methods.

FIG. 4 illustrates one exemplary embodiment of methodology 400 that may be implemented (e.g., by BMU 266 of a replaceable battery pack 265 of information handling system 200) to rearrange battery cell configuration upon the detection of one or more defective or failed battery cells 302. As shown, methodology 400 starts in step 402 where all battery cells 302 of battery cell circuitry 324 are electrically coupled together to provide a battery pack 265 with full battery capacity for powering an information handling system 200, e.g., all four battery cells 302 of FIG. 3 are initially electrically coupled together in series to provide power in a 4S1P battery configuration. In step 404, the status of each of the individual battery cells 302 of battery cell circuitry 324 is monitored in real time. As long as no battery cell's 302 are detected to be defective in step 406, then all battery cells 302 of battery cell circuitry 324 remain electrically coupled together (e.g., in a 4S1P configuration for battery cell circuitry 324 of FIG. 3) and monitoring of the individual battery cell/s 302 continues in step 404. However, if one or more defective battery cells 302 are detected in step 406 (e.g., battery cells 302 having low voltage relative to other battery cells 302 such as to result in battery cell imbalance), then the capacity of battery pack 265 is downgraded by bypassing or removing one or more defective battery cells 302 from the main battery conductor path in step 408, e.g., by closing the respective switching device/s 304 of FIG. 3 that corresponds to the defective battery cell/s 302 to result in a 3S1P configuration for battery cell circuitry 324. Other examples of battery capacity downgrades include change from an original 3S2P battery cell configuration to a 3S1P battery cell configuration.

Still referring to FIG. 4, the user (e.g., user of information handling system 200) may be informed of the defective status of battery pack 265 and optionally of a pre-determined reduced continued operation time ($T_{OP}$) of the downgraded battery pack 265 in step 410, e.g., by message displayed on display 225 of information handling system 200. In this regard, $T_{OP}$ may be a period of time having a length (e.g., 100 hours) selected, for example, to allow a user sufficient information handling system operation time to obtain a replacement battery pack 265. As further shown by optional steps 412 and 414 of FIG. 4, the battery pack 265 may be optionally disabled (e.g., entire battery pack disabled) after the pre-determined operation time ($T_{OP}$) has passed since time of detection of the first defective battery cell 302 in the battery pack 265. Specifically, in step 412 the time elapsed ($T_E$) since first detection of a defective battery cell 302 is compared to the pre-determined $T_{OP}$ in step 412. $T_E$ may be calculated, for example, by starting a timer upon first detection of a defective battery cell in step 406. If $T_E$ is found less than $T_{OP}$ in step 412, then methodology returns to step 404 and steps 404 to 412 repeat in an iterative manner. If at any time (such as after battery cell discharge and charge cycling), previously bypassed defective battery cells 302 are no longer detected in step 406 (e.g., it is determined based on cell voltage, including impedance calculated from cell voltage, that battery cell imbalance or other symptoms of defect will no longer exist if the bypassed battery cells 302 are re-inserted), then the previously removed battery cell/s 302 may be reinserted into the main battery conductor path in step 407, e.g., by opening the respective switching device/s 304 of FIG. 3 that corresponds to the defective battery cell/s 302 to once again result in a 4S1P configuration for battery cell circuitry 324.

However, if $T_E$ is found equal to or greater than $T_{OP}$ in step 412, then methodology 400 proceeds to step 414 and disables the entire battery pack, e.g., by opening both D-FET 382 and C-FET 380 or other suitable switching device/s in the current path between battery pack 265 and other system components 267 of information handling system 200 to put the battery pack 265 in pack failure (PF) mode.

Figure 5:
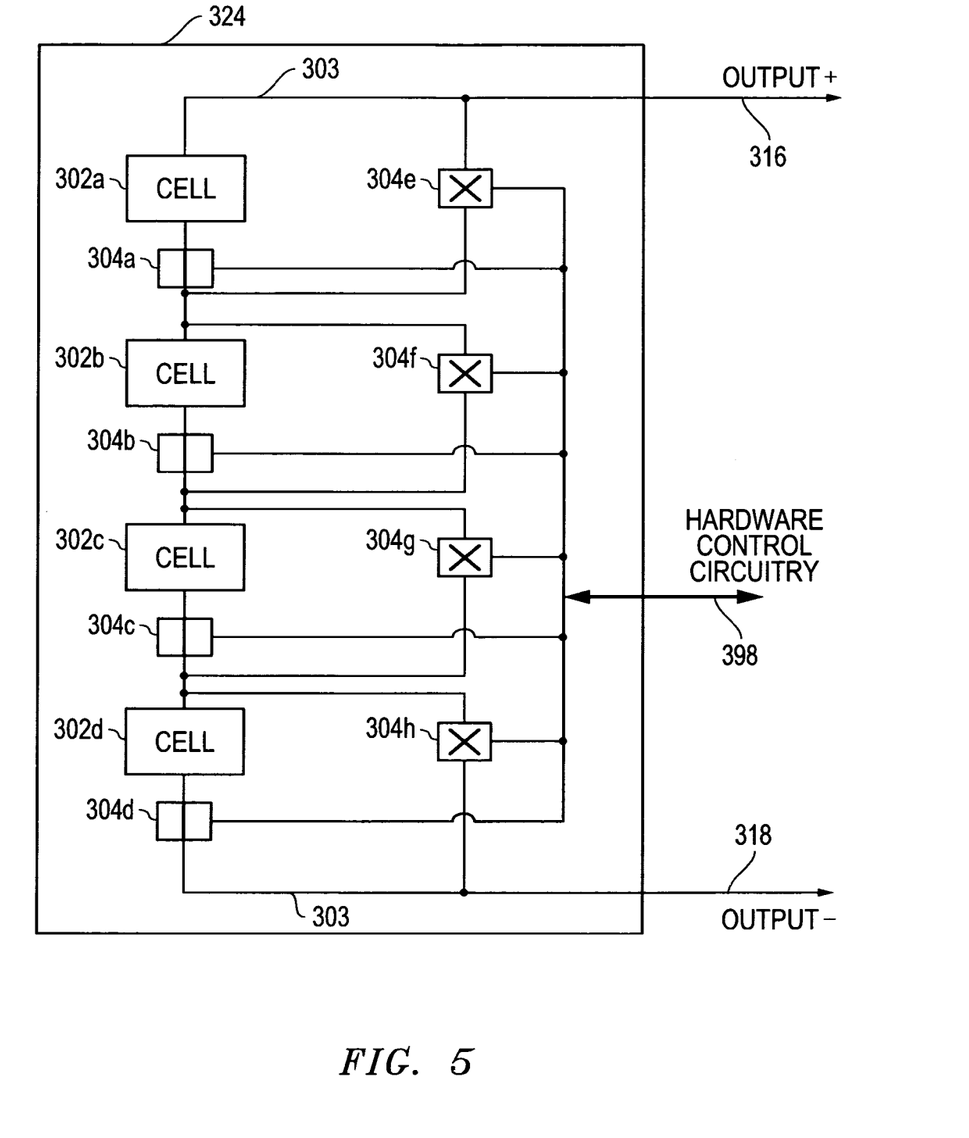
FIG. 5 is a block diagram of battery cell circuitry according to one exemplary embodiment of the disclosed systems and methods.

In another exemplary embodiment of the disclosed systems and methods, individual cells of a non-defective battery pack 265 may be selectively controlled to optimize battery pack performance under various operation conditions of information handling system 200, e.g., to match different system loads being drawn by the other system components 267 of information handling system 200, or to match different operating modes of information handling system 200. For example, FIG. 5 illustrates an example of battery cell circuitry 324 of a battery pack 265 as it may be configured according to one exemplary embodiment of the disclosed systems and methods such that each individual battery cell 302 may be selectively isolated to vary battery pack performance. In this embodiment, battery cell circuitry 324 is provided with four battery cells 302a-302d that are coupled together by main battery conductor path 303 in a 4S1P configuration between battery output terminals 316 and 318. As in the embodiment of FIG. 3, a corresponding switch device 304e-304h is provided for each respective one of battery cells 302a-302d, and is coupled in parallel to form a conductive path around a corresponding battery cell 302 by respective bypass conductors provided for each corresponding switch device 304 around a corresponding battery cell 302. As shown, an additional corresponding switch device 304a-304d is coupled in series with each corresponding battery cell 302a-302d so that it may be employed to selectively block the conduction of current from its corresponding battery cell.

Still referring to FIG. 5, status and control bus 398 is provided to independently and selectively control conductive status of each switch device 304a-304h within battery cell circuitry 324 based on control signals received from BMU 266 or other suitable processing device/s. As with the embodiment of FIG. 3, status and control bus 398 may also convey cell status information to BMU 266 or other suitable processing device/s from each cell 302 of battery cell circuitry 324. When battery cell circuitry 324 is coupled as part of a battery pack 265 to power an information handling system 200, each of switching devices 304a-304d may be set in a closed (conducting) condition and each of switching devices 304e-304h may be set in an open (non-conducting) condition as shown during normal mode operation (e.g., full power or high performance operation) of information handling system 200, such that current is provided from all battery cells 302a-302d to deliver full battery capacity operation in the 4S1P configuration. Upon a change in status of information handling system from normal operation mode to a reduced power mode where one or more system load components (e.g., display 225) of information handling system consume less power (e.g., power conservation mode, suspend mode, etc.), one or more battery cells 302 may be bypassed or removed from the main battery conductor path 303 of battery cell circuitry 324. In one exemplary embodiment, the one or more battery cells 302 may be removed from the main battery conductor path 303 only for battery system discharge operations and added back into the main battery conductor path 303 when battery system 265 is undergoing charging, e.g., from battery charger/power circuit 260.

In one exemplary embodiment, the current operating status of information handling system 200 may be communicated to BMU 266 across SMBus 281 from system BIOS running on embedded controller (EC) 280. Upon receipt of information indicating that information handling system 200 has entered a reduced power mode, BMU 266 may determine a modified battery cell configuration in which one or more battery cells 302 are bypassed or removed from main power conductor path 303 of battery cell circuitry 324. BMU 266 may make this determination, e.g., based on a stored lookup table of pre-determined battery cell configuration versus information handling system status, algorithm, etc. In one example, BMU 266 may modify the battery configuration to obtain best performance and extend the battery life cycle under different user modes, for example, by changing the battery cell configuration of battery cell circuitry 324 from a full capacity 4S2P configuration (that outputs 14.8 volts) to a 3S1P configuration (that outputs 11.1 volts) when information handling system 200 enters idle/sleep operation mode. In this regard, lower input voltage results in better power converting efficiency, and the life of removed (e.g., bypassed) battery cells that are not needed will be extended. For example, with 14.8V input, the Duty cycle(D)=V0/V1 is D=3.3/14.8=0.22 and for 11.1V input, the Duty cycle D=3.3/11.1=0.30

Still referring to the previous embodiment, upon receipt of further information indicating that information handling system 200 has returned to a higher power (e.g., full power) mode, BMU 266 may determine a modified battery cell configuration in which the previously removed or bypassed battery cells 302 are added back to the main power conductor path 303 of battery cell circuitry 324, for example, by changing the battery cell configuration of battery cell circuitry 324 from the reduced capacity 3S1P configuration to the full capacity 4S2P configuration. Alternatively, when BMU 266 determines that battery system 265 is undergoing charging, the previously removed or bypassed battery cells 302 may be added back to the main power conductor path 303 of battery cell circuitry 324 in a similar manner, e.g., by changing the battery cell configuration of battery cell circuitry 324 from the reduced capacity 3S1P configuration to the full capacity 4S2P configuration for charging operations.

Once BMU 266 has determined a modified battery cell configuration, BMU 266 may then provide control signal's via status and control bus 398 to open and/or close the switching device/s 304 that correspond to selected battery cell/s 302 so as to result in the desired battery configuration that corresponds to the current operating mode of information handling system 200. In one exemplary embodiment, programming code of BMU 266 or other processing device controlling battery cell configuration may be protected to prevent access by a user of information handling system 200, and may be read-only for system BIOS.

Figure 6:
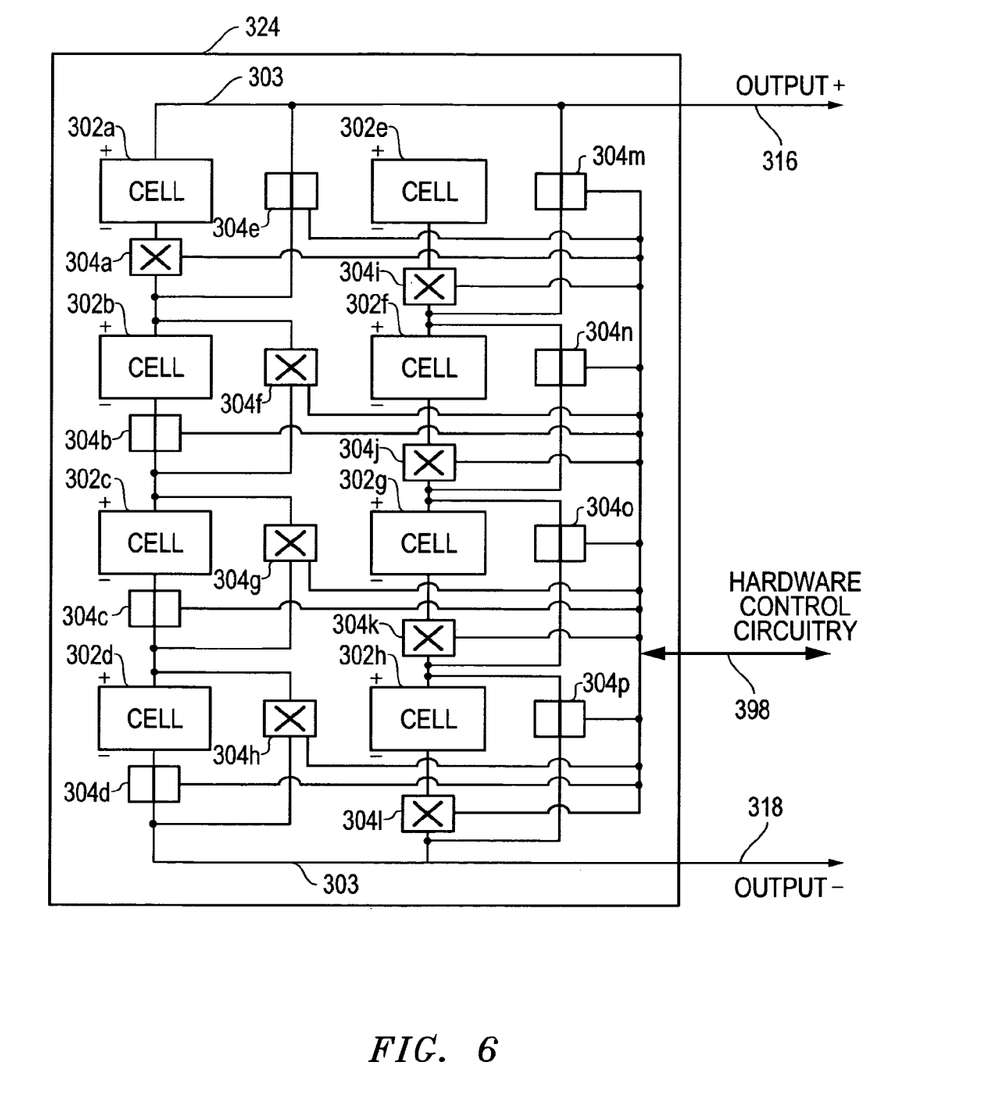
FIG. 6 is a block diagram of battery cell circuitry according to one exemplary embodiment of the disclosed systems and methods.

FIG. 6 illustrates another exemplary embodiment of battery cell circuitry 324 of a battery pack 265 as it may be configured according to one exemplary embodiment of the disclosed systems and methods such that each individual battery cell 302 may be selectively isolated to vary battery pack performance. In this embodiment, battery cell circuitry 324 is provided with eight battery cells 302a-302h that are coupled together by main battery conductor path 303 in a 4S2P configuration between battery output terminals 316 and 318. A corresponding switch device 304e-304h and 304m-304p is provided for each respective one of battery cells 302a-302h that is coupled in parallel to form a conductive path around a corresponding battery cell 302 by respective bypass conductors provided for each corresponding switch device 304 around a corresponding battery cell 302. As further shown, an additional corresponding switch device 304a-304d and 304i-304l is coupled in series with each corresponding battery cell 302a-302h so that it may be employed to selectively block the conduction of current from its corresponding battery cell. Once again, status and control bus 398 is provided to independently and selectively control conductive status of each switch device 304a-304p within battery cell circuitry 324 based on control signals received from BMU 266 or other suitable processing device/s, and may also convey cell status information to BMU 266 or other suitable processing device/s from each cell 302 of battery cell circuitry 324.

FIG. 6 illustrates switch devices 304a-304p as they may be set by BMU 266 or other processing device via control signals provided across status and control bus 398 to open and/or close the switching device/s 304 that correspond to selected battery cell/s 302 so as to change the way battery cells 302 are electrically coupled together so that battery cell circuitry 324 is changed from a 4S2P to a 3S1P battery configuration. In this regard, switch device 304a has been opened and switch device 304e closed so as to bypass and remove battery cell 308a from the main conductive path 303 of battery cell circuitry 324. Further, each of switch devices 304i-304l have been opened as shown and each of switch devices 304m-304p has been closed as shown so as to remove each of battery cells 302e-302h from main conductive path 303 of battery cell circuitry 324. The resulting 3S1P battery cell configuration has a reduced battery capacity that may be selected, for example, by BMU 266 to correspond to a reduced power operating mode of information handling system 200. The configuration of FIG. 6 also allows BMU 266 or other suitable processing device to modify the battery cell configuration of battery cell circuitry 324 in the event of failure of one or more battery cells 302 in a manner similar to that described in relation to FIG. 3, e.g., by closing one or more of switching device/s 304e-304h and/or 304m-304p that correspond to the detected defective cell/s 302 so as to form a conductive path that bypasses each of the defective cell/s 302 and leaving only the non-defective cell/s electrically coupled within the main battery conductor path 303.

It will be understood that the particular number and configuration of battery cells illustrated in each of FIGS. 3, 5 and 6 are exemplary only, and that a battery cell circuitry 324 may be configured with any number of two or more battery cells in the practice of the disclosed systems and methods. Other example battery configurations include, but are not limited to, 2S2P, 3S2P, 3S3P, 4S3P, 5S1P, 5S2P, 5S3P, 5S4P, etc. Moreover, it will be understood that any combination of battery cells may be removed form the main battery conductor path 303 of battery cell circuitry 324. For example, in the battery cell circuit configuration of FIG. 6, the full battery capacity configuration of 4S2P may be change to 2S2P by opening switch devices 304a, 304b, 304i and 304j, and closing switch devices 304e, 304f, 304m and 304n. Similarly, a 2S1P configuration may be achieved by opening switch devices 304a-304d, 304i and 304j, and by closing switch devices 304e-304h, 304m and 304n. Other battery cell configurations may be achieved by selectively removing any other combination of battery cells from the main current path 303 of battery cell circuitry 324.

In yet another embodiment, battery cell circuitry 324 may be controlled by a single microcontroller, e.g., BMU 266, and/or with no communication among modules. Further, BMU 266 may operate to balance modules of battery cell circuitry 324, e.g., when imbalances occur between modules due to occurrence of defective or degraded battery cells 302. In this regard, when a defective or degraded cell is reported in one module of battery cell circuitry 324, all other modules may be re-configured to match (e.g., to balance the battery cell circuitry 324) in view of the defective or degraded cell.

For example, still referring to the embodiment of FIG. 6, battery cell circuitry 324 includes two 4S1P modules connected in parallel in a 8-cell battery pack configuration, i.e., a first module defined by cells 302a-302d, and a second module defined by cells 302e-302h. Upon detecting that a given battery cell/s of one of the two modules (e.g., cell 302a) is defective or degraded in capacity, BMU 266 may control appropriate switch devices 304 to remove the defective or degraded battery cell/s from the main battery conductor path 303 of the affected module, e.g., to result in a 3S1P cell configuration including cells 302b-302d). At the same time, BMU 266 may also determine (e.g., via calculation and/or measurement) that a voltage imbalance is created between multiple modules due to the removed battery cell/s, and take action to restore inter-module balance by removing a corresponding number of good battery cell/s (e.g., cell 302e) from the other non-affected module, e.g., to result in a 3S1P cell configuration including cells 302f-302h so that the first and second modules of FIG. 6 remain balanced in voltage. In the previous example, BMU 266 may thus modify battery cell circuitry 324 from two 4S1P modules in a 8-cell pack configuration to two 3S1P modules in a 6-cell pack configuration. BMU 266 may later reinsert a removed degraded cell 302 back into its respective module once BMU 266 determines (e.g., via calculation and/or measurement) that battery voltage between the multiple modules has become balanced again with all cells inserted into the main battery conductor path of each module, e.g., as may occur after other non-removed cells 302 have being discharge and charge cycled so that all cells of battery cell circuitry 324 become balanced again.

It will also be understood that one or more of the tasks, functions, or methodologies described herein (e.g., for BMU 266 or other suitable processing device) may be implemented, for example, as firmware or other computer program of instructions embodied in a tangible computer readable medium that is executed by a CPU, microcontroller, or other suitable processing device. Further, although replaceable smart battery packs are described in relation to some of the embodiments herein, it will be understood that the disclosed systems and methods may be implemented with battery systems that are non-replaceable and/or with battery systems controlled by external processing device/s.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
a system load;
a battery system having a main battery conductor path coupled to power the system load, the battery system comprising:
  battery cell circuitry including multiple battery cells coupled together in the main battery conductor path in at least one of series relationship, parallel relationship, or a combination thereof;
  one or more switching devices coupled to selectively bypass or remove each of the multiple battery cells separately from the main battery conductor path of the battery cell circuitry;
at least one processing device coupled to control the one or more switching devices to selectively bypass or remove one or more of the multiple battery cells separately from the main battery conductor path of the battery cell circuitry while leaving one or more others of the multiple battery cells included in the main battery conductor path of the battery cell so that the battery cell remains capable of powering the information handling system load; and
memory coupled to the at least one processing device having stored thereon a lookup table of predetermined battery cell configurations versus information handling system status; and where the at least one processing device is coupled to:

determine a modified battery cell configuration corresponding to a present operating status of the information handling system by accessing the lookup table stored in the memory, the modified battery cell configuration being different than a current battery cell configuration, and change the current battery cell configuration to the determined modified battery cell configuration by bypassing or removing one or more of the multiple battery cells separately from the main battery conductor path of the battery cell circuitry while leaving one or more others of the multiple battery cells included in the main battery conductor path of the battery cell so that the battery cell remains capable of powering the information handling system load.

2. The information handling system of claim 1, wherein the at least one processing device is configured to control the one or more switching devices in real time to selectively vary the number of battery cells in the main battery conductor path of the battery cell circuitry based on the amount of power consumed by the system load.

3. The information handling system of claim 2, wherein the system load comprises one or more components configured to operate in at least one power mode that consumes less power than at least one other power mode; wherein the at least one processing device is configured to control the one or more switching devices in real time to selectively remove one or more of the multiple battery cells from the main battery conductor path of the battery cell circuitry when the one or more components of the system load operate in the power mode that consumes less power; and wherein the at least one processing device is configured to control the one or more switching devices in real time to selectively add one or more of the multiple battery cells into the main battery conductor path of the battery cell circuitry when the one or more components of the system load operate in the power mode that consumes more power or when the battery system is undergoing recharging operations.

4. The information handling system of claim 1, wherein the at least one processing device is coupled to monitor the voltage of each of the multiple battery cells of the battery cell circuitry; and wherein the at least one processing device is configured to control the one or more switching devices in real time so as to selectively bypass or remove one or more defective or degraded battery cells from the main battery conductor path of the battery cell circuitry when the defective or degraded voltage state of the one or more defective or degraded battery cells is detected such that at least one remaining non-defective or non-degraded battery cell remains electrically coupled within the main battery conductor path of the battery cell circuitry and continues to supply power to the main battery conductor path of the battery cell circuitry.

5. The information handling system of claim 4, wherein the at least one processing device is configured to control the one or more switching devices in real time so as to selectively re-insert one or more of the removed defective or degraded battery cells back into the main battery conductor path of the battery cell circuitry when the defective or degraded voltage state of the one or more defective or degraded battery cells is no longer detected to be present.

6. The information handling system of claim 1, wherein the at least one processing device is coupled to monitor the voltage of each of the multiple battery cells of the battery cell circuitry; and wherein the at least one processing device is configured to control the one or more switching devices in real time so as to selectively bypass or remove one or more degraded battery cells from the main battery conductor path of the battery cell circuitry when the degraded voltage state of the one or more defective or degraded battery cells is detected such that at least one remaining non-degraded battery cell remains electrically coupled within the main battery conductor path of the battery cell circuitry and continues to supply power to the main battery conductor path of the battery cell circuitry.

7. The information handling system of claim 1, where the one or more switching devices are coupled to selectively bypass each of the multiple battery cells separately from the main battery conductor path of the battery cell circuitry, each of the one or more switching devices being coupled in parallel to a corresponding battery cell to form a conductive path around the corresponding battery cell; and where the at least one processing device is coupled to selectively close each switching device corresponding to a given battery cell so as to form a conductive path around the corresponding battery cell so as to electrically bypass the corresponding battery cell within the main battery conductor path at the same time that the switching device corresponding to at least one other given battery cell remains open to leave the at least one other given battery cell electrically coupled within the main battery conductor path.

8. The information handling system of claim 1, where the battery cell circuitry includes multiple battery cells coupled together in the main battery conductor path in to form at least two parallel modules, each of the parallel modules comprising at least two battery cells coupled in series; and where the at least one processing device is coupled to control the one or more switching devices to substantially balance voltage of the at least two parallel modules with each other upon occurrence of a voltage imbalance between the at least two modules that exists due to presence of a defective or degraded battery cell in at least a first one of the parallel modules by:

selectively bypassing or removing at least one battery cell of at least a second one of the parallel modules from series coupling in the main battery conductor path while leaving at least one other battery cell of the second parallel module coupled in series in the main battery conductor path so as to substantially balance the voltage of the second parallel module with the first parallel module.

9. The information handling system of claim 1, where the battery cell circuitry includes multiple battery cells coupled together in the main battery conductor path in parallel relationship.

10. The information handling system of claim 1, where the at least one processing device is coupled to control the one or more switching devices to vary the number of battery cells connected together in the main battery conductor path so that the battery cell configuration is different for charging operations than for discharging operations.

11. An information handling system, comprising:
a system load;
a battery system having a main battery conductor path coupled to power the system load, the battery system comprising:
battery cell circuitry including multiple battery cells coupled together in the main battery conductor path in at least one of series relationship, parallel relationship, or a combination thereof,
one or more switching devices coupled to selectively bypass or remove each of the multiple battery cells separately from the main battery conductor path of the battery cell circuitry; and at least one processing device coupled to control the one or more switching devices to selectively bypass or remove one or more of the multiple battery cells separately from the main battery conductor path of the battery cell circuitry while leaving one or more others of the multiple battery cells included in the main battery conductor path of the battery cell so that the battery cell remains capable of powering the information handling system load;

wherein the at least one processing device is coupled to monitor the voltage of each of the multiple battery cells of the battery cell circuitry; and wherein the at least one processing device is configured to control the one or more switching devices in real time so as to selectively bypass or remove one or more defective or degraded battery cells from the main battery conductor path of the battery cell circuitry when the defective or degraded voltage state of the one or more defective or degraded battery cells is detected such that at least one remaining non-defective or non-degraded battery cell remains electrically coupled within the main battery conductor path of the battery cell circuitry and continues to supply power to the main battery conductor path of the battery cell circuitry; and wherein the at least one processing device is configured to disable the entire battery system to prevent it from supplying any power to the system load after first allowing the at least one remaining non-defective or non-degraded battery cell to continue to supply power to the main battery conductor path of the battery cell circuitry for a pre-determined operation time ($T_{OP}$) since time of first detection of a defective or degraded battery cell in the battery system.

12. The information handling system of claim 11, further comprising a video display device configured to display information to a user of the information handling system; and wherein the at least one processing device is configured to generate a message for display to a user of the information handling system that informs the user of the pre-determined operation time ($T_{OP}$) remaining before the entire battery system is to be disabled.

13. The information handling system of claim 1, wherein the information handling system is a portable information handling system; wherein the battery system is a replaceable battery pack of the portable information handling system; and wherein the at least one processing device is a battery management unit (BMU) of the replaceable battery pack.

14. The information handling system of claim 11, further comprising memory coupled to the at least one processing device having stored thereon a lookup table of predetermined battery cell configurations versus information handling system status; and where the at least one processing device is coupled to:

determine a modified battery cell configuration corresponding to a present operating status of the information handling system by accessing the lookup table stored in the memory, the modified battery cell configuration being different than a current battery cell configuration; and change the current battery cell configuration to the determined modified battery cell configuration by bypassing or removing one or more of the multiple battery cells separately from the main battery conductor path of the battery cell circuitry while leaving one or more others of the multiple battery cells included in the main battery conductor path of the battery cell so that the battery cell remains capable of powering the information handling system load.

15. A method of controlling a battery system of an information handling system, comprising:

providing a battery system having a main battery conductor path coupled to power a system load of the information handling system, the battery system comprising:

battery cell circuitry including multiple battery cells coupled together in the main battery conductor path in at least one of series relationship, parallel relationship, or a combination thereof, one or more switching devices coupled to selectively bypass or remove each of the multiple battery cells separately from the main battery conductor path of the battery cell circuitry;

controlling the one or more switching devices to selectively bypass or remove one or more of the multiple battery cells separately from the main battery conductor path of the battery cell circuitry while leaving one or more others of the multiple battery cells included in the main battery conductor path of the battery cell so that the battery cell remains capable of powering the information handling system load;

providing memory including stored thereon a lookup table of predetermined battery cell configurations versus information handling system status;

determining a modified battery cell configuration corresponding to a present operating status of the information handling system by accessing the lookup table stored in the memory, the modified battery cell configuration being different than a current battery cell configuration; and changing the current battery cell configuration to the determined modified battery cell configuration by bypassing or removing one or more of the multiple battery cells separately from the main battery conductor path of the battery cell circuitry while leaving one or more others of the multiple battery cells included in the main battery conductor path of the battery cell so that the battery cell remains capable of powering the information handling system load.

16. The method of claim 15, further comprising controlling the one or more switching devices in real time to selectively vary the number of battery cells in the main battery conductor path of the battery cell circuitry based on the amount of power consumed by the system load.

17. The method of claim 16, further comprising operating one or more components of the system load of the information handling system in at least one power mode that consumes less power than at least one other power mode; controlling the one or more switching devices in real time to selectively remove one or more of the multiple battery cells from the main battery conductor path of the battery cell circuitry when the one or more components of the system load operate in the power mode that consumes less power; and controlling the one or more switching devices in real time to selectively add one or more of the multiple battery cells into the main battery conductor path of the battery cell circuitry when the one or more components of the system load operate in the power mode that consumes more power or when the battery system is undergoing recharging operations.

18. The method of claim 15, further comprising monitoring the voltage of each of the multiple battery cells of the battery cell circuitry; detecting the defective or degraded voltage state of one or more of the battery cells of the battery cell circuitry; and controlling the one or more switching devices in real time so as to selectively bypass or remove the one or more detected defective or degraded battery cells from the main battery conductor path of the battery cell circuitry when the defective or degraded voltage state of the one or more defective or degraded battery cells is detected such that at least one remaining non-defective or non-degraded battery cell remains electrically coupled within the main battery conductor path of the battery cell circuitry and continues to supply power to the main battery conductor path of the battery cell circuitry.

19. The method of claim 18, further comprising controlling the one or more switching devices in real time so as to selectively re-insert one or more of the removed defective or degraded battery cells back into the main battery conductor path of the battery cell circuitry when the defective or degraded voltage state of the one or more defective or degraded battery cells is no longer detected to be present.

20. The method of claim 15, wherein the information handling system is a portable information handling system; and wherein the battery system is a replaceable battery pack of the portable information handling system.

21. The method of claim 15, further comprising monitoring the voltage of each of the multiple battery cells of the battery cell circuitry; detecting the degraded voltage state of one or more of the battery cells of the battery cell circuitry; and controlling the one or more switching devices in real time so as to selectively bypass or remove the one or more detected degraded battery cells from the main battery conductor path of the battery cell circuitry when the degraded voltage state of the one or more degraded battery cells is detected such that at least one remaining non-degraded battery cells remain cell remains electrically coupled within the main battery conductor path of the battery cell circuitry and continues to supply power to the main battery conductor path of the battery cell circuitry.

22. The method of claim 15, where the one or more switching devices are coupled to selectively bypass each of the multiple battery cells separately from the main battery conductor path of the battery cell circuitry, each of the one or more switching devices being coupled in parallel to a corresponding battery cell to form a conductive path around the corresponding battery cell; and where the method further comprises controlling the one or more switching devices in real time to:
  selectively close at least one of the switching devices corresponding to a given battery cell so as to form a conductive path around the corresponding battery cell so as to electrically bypass the corresponding battery cell within the main battery conductor path; and
  at the same time selectively open at least one other of the switching devices corresponding to at least one other given battery cell to leave the at least one other given battery cell electrically coupled within the main battery conductor path.

23. The method of claim 15, where the battery cell circuitry includes multiple battery cells coupled together in the main battery conductor path in to form at least two parallel modules, each of the parallel modules comprising at least two battery cells coupled in series; and where the method further comprises:
  detecting the occurrence of a voltage imbalance between the two parallel modules that exists due to presence of a defective or degraded battery cell in at least a first one of the parallel modules; and
  in response controlling the one or more switching devices to substantially balance voltage of the at least two parallel modules with each other by selectively bypassing or removing at least one battery cell of at least a second one of the parallel modules from series coupling in the main battery conductor path while leaving at least one other battery cell of the second parallel module coupled in series in the main battery conductor path so as to substantially balance the voltage of the second parallel module with the first parallel module.

24. The method of claim 15, where the battery cell circuitry includes multiple battery cells coupled together in the main battery conductor path in parallel relationship.

25. The method of claim 15, further comprising:
  charging and discharging the battery system; and
  controlling the one or more switching devices to vary the number of battery cells connected together in the main battery conductor path so that the battery cell configuration is different for charging operations than for discharging operations.

26. A method of controlling a battery system of an information handling system, comprising:
  providing a battery system having a main battery conductor path coupled to power a system load of the information handling system, the battery system comprising:
    battery cell circuitry including multiple battery cells coupled together in the main battery conductor path in at least one of series relationship, parallel relationship, or a combination thereof,
    one or more switching devices coupled to selectively bypass or remove each of the multiple battery cells separately from the main battery conductor path of the battery cell circuitry;
  controlling the one or more switching devices to selectively bypass or remove one or more of the multiple battery cells separately from the main battery conductor path of the battery cell circuitry while leaving one or more others of the multiple battery cells included in the main battery conductor path of the battery cell so that the battery cell remains capable of powering the information handling system load;
  monitoring the voltage of each of the multiple battery cells of the battery cell circuitry; detecting the defective or degraded voltage state of one or more of the battery cells of the battery cell circuitry; and controlling the one or more switching devices in real time so as to selectively bypass or remove the one or more detected defective or degraded battery cells from the main battery conductor path of the battery cell circuitry when the defective or degraded voltage state of the one or more defective or degraded battery cells is detected such that at least one remaining non-defective or non-degraded battery cell remains electrically coupled within the main battery conductor path of the battery cell circuitry and continues to supply power to the main battery conductor path of the battery cell circuitry; and
  disabling the entire battery system to prevent it from supplying any power to the system load of the information handling system after first allowing the at least one remaining non-defective or degraded battery cell cells to continue to supply power to the main battery conductor path of the battery cell circuitry for a pre-determined operation time ($T_{OP}$) since time of first detection of a defective or non-degraded battery cell in the battery system.

27. The method of claim 26, wherein the information handling system further comprises a video display device; and the method further comprises generating a message and displaying the generated message to a user of the information handling system to inform the user of the pre-determined operation time ($T_{OP}$) remaining before the entire battery system is to be disabled.

28. The method of claim 26, further comprising:
providing memory including stored thereon a lookup table of predetermined battery cell configurations versus information handling system status;
determining a modified battery cell configuration corresponding to a present operating status of the information handling system by accessing the lookup table stored in the memory, the modified battery cell configuration being different than a current battery cell configuration; and
changing the current battery cell configuration to the determined modified battery cell configuration by bypassing or removing one or more of the multiple battery cells separately from the main battery conductor path of the battery cell circuitry while leaving one or more others of the multiple battery cells included in the main battery conductor path of the battery cell so that the battery cell remains capable of powering the information handling system load.

29. A replaceable smart battery pack configured for powering an information handling system, comprising:
a main battery conductor path configured for coupling to power the system load;
battery cell circuitry including multiple battery cells coupled together in the main battery conductor path in at least one of series relationship, parallel relationship, or a combination thereof;
one or more switching devices coupled to selectively bypass or remove each of the multiple battery cells separately from the main battery conductor path of the battery cell circuitry;
at least one processing device coupled to control the one or more switching devices to selectively bypass or remove one or more of the multiple battery cells from the main battery conductor path of the battery cell circuitry while leaving one or more others of the multiple battery cells included in the main battery conductor path of the battery cell so that the battery cell remains capable of powering the information handling system load; and
memory coupled to the at least one processing device having stored thereon a lookup table of predetermined battery cell configurations versus information handling system status; and where the at least one processing device is coupled to:
determine a modified battery cell configuration corresponding to a present operating status of the information handling system by accessing the lookup table stored in the memory, the modified battery cell configuration being different than a current battery cell configuration, and
change the current battery cell configuration to the determined modified battery cell configuration by bypassing or removing one or more of the multiple battery cells separately from the main battery conductor path of the battery cell circuitry while leaving one or more others of the multiple battery cells included in the main battery conductor path of the battery cell so that the battery cell remains capable of powering the information handling system load.

30. The replaceable smart battery pack of claim 29, wherein the at least one processing device is configured to control the one or more switching devices in real time to selectively vary the number of battery cells in the main battery conductor path of the battery cell circuitry based on the amount of power consumed by the system load.

31. The replaceable smart battery pack of claim 30, wherein the main battery conductor path is configured for coupling to one or more system load components of the information handling system that are configured to operate in at least one power mode that consumes less power than at least one other power mode; wherein the at least one processing device of the replaceable smart battery pack is configured to control the one or more switching devices in real time to selectively remove one or more of the multiple battery cells from the main battery conductor path of the battery cell circuitry when the one or more components of the system load operate in the power mode that consumes less power; and wherein the at least one processing device is configured to control the one or more switching devices in real time to selectively add one or more of the multiple battery cells into the main battery conductor path of the battery cell circuitry when the one or more components of the system load operate in the power mode that consumes more power or when the smart battery pack is undergoing recharging operations.

32. The replaceable smart battery pack of claim 29, wherein the at least one processing device is coupled to monitor the voltage of each of the multiple battery cells of the battery cell circuitry; and wherein the at least one processing device is configured to control the one or more switching devices in real time so as to selectively bypass or remove one or more defective or degraded battery cells from the main battery conductor path of the battery cell circuitry when the defective or degraded voltage state of the one or more defective or degraded battery cells is detected such that at least one remaining non-defective or non-degraded battery cells remains electrically coupled within the main battery conductor path of the battery cell circuitry and continues to supply power to the main battery conductor path of the battery cell circuitry.

33. The replaceable smart battery park of claim 32, wherein the at least one processing device is configured to control the one or more switching devices in real time so as to selectively re-insert one or more of the removed defective or degraded battery cells back into the main battery conductor path of the battery cell circuitry when the defective or degraded voltage state of the one or more defective or degraded battery cells is no longer detected to be present.

34. A replaceable smart battery pack configured for powering an information handling system, comprising:
a main battery conductor path configured for coupling to power the system load;
battery cell circuitry including multiple battery cells coupled together in the main battery conductor path in at least one of series relationship, parallel relationship, or a combination thereof;
one or more switching devices coupled to selectively bypass or remove each of the multiple battery cells separately from the main battery conductor path of the battery cell circuitry; and
at least one processing device coupled to control the one or more switching devices to selectively bypass or remove one or more of the multiple battery cells from the main battery conductor path of the battery cell circuitry while leaving one or more others of the multiple battery cells included in the main battery conductor path of the battery cell so that the battery cell remains capable of powering the information handling system load;
wherein the at least one processing device is coupled to monitor the voltage of each of the multiple battery cells of the battery cell circuitry; and wherein the at least one processing device is configured to control the one or more switching devices in real time so as to selectively bypass or remove one or more defective or degraded battery cells from the main battery conductor path of the battery cell circuitry when the defective or degraded voltage state of the one or more defective or degraded battery cells is detected such that at least one remaining non-defective or non-degraded battery cell remains electrically coupled within the main battery conductor path of the battery cell circuitry and continues to supply power to the main battery conductor path of the battery cell circuitry; and wherein the at least one processing device is configured to disable the entire battery system to prevent it from supplying any power to the system load after first allowing the at least one remaining non-defective or non-degraded battery cell to continue to supply power to the main battery conductor path of the battery cell circuitry for a pre-determined operation time ($T_{OP}$) since time of first detection of a defective or degraded battery cell in the battery system.

* * * * *